No. 857,970. PATENTED JUNE 25, 1907.
C. WÜST-KUNZ.
FRICTION CLUTCH.
APPLICATION FILED MAY 31, 1904.
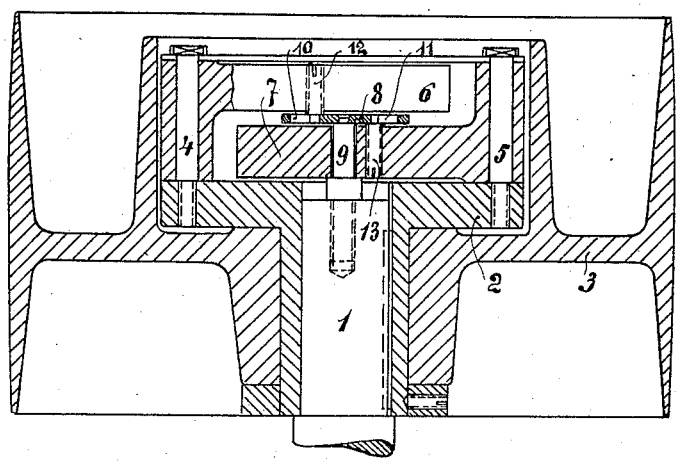
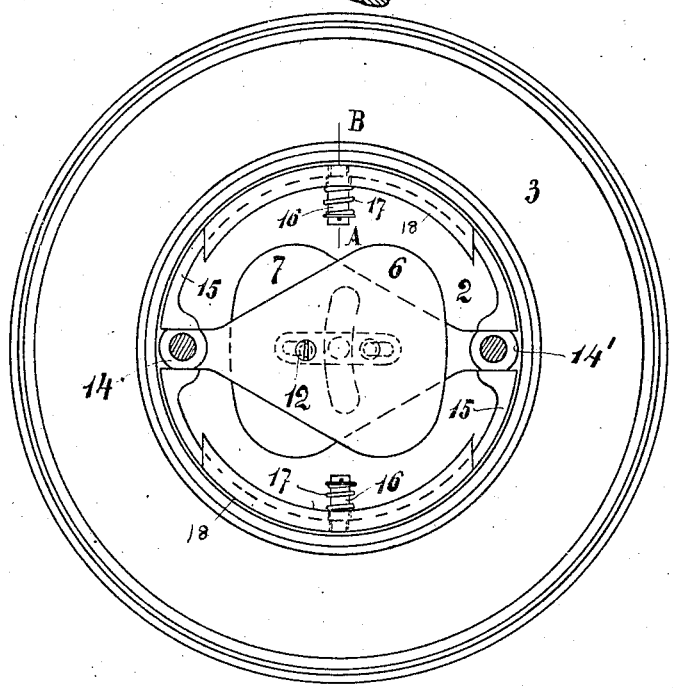
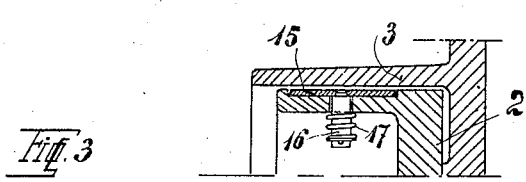
Witnesses
A. J. Haddan
E. M. Moore
Inventor
Caspar Wüst-Kunz
by his Attorney R. Haddan

UNITED STATES PATENT OFFICE.

CASPAR WÜST-KUNZ, OF SEEBACH, NEAR ZURICH, SWITZERLAND.

FRICTION-CLUTCH.

No. 857,970.

Specification of Letters Patent.

Patented June 25, 1907.

Application filed May 31, 1904. Serial No. 210,542.

*To all whom it may concern:*

Be it known that I, CASPAR WÜST-KUNZ, a citizen of the Swiss Republic, residing at Seebach, near Zurich, Switzerland, have invented certain new and useful Improvements in Friction-Clutches, of which the following is a specification.

This invention relates to an improved clutch for use with engines which are incapable of starting while the load is on, the said clutch being adapted to automatically couple the engine with a pulley or the like when the former has attained a certain speed, so that the engine can be started without the load and will then automatically take the full load when it has run up to a certain number of revolutions.

The invention is illustrated in the annexed drawings, in which

Figure 1 is a cross-section of the clutch, Fig. 2 a side view thereof, and Fig. 3 a section on the line A—B of Fig. 2.

The coupling disk 2 is fixed to the motor shaft 1, whereas the pulley 3 to be driven is mounted loosely on the latter. To the disk 2 are screwed two gudgeons 4 and 5, about which two weights 6 and 7 respectively are adapted to oscillate. The line connecting the center of gravity of each weighted lever and its pivotel center is radial to the axis of the driving member. Between the said weights, which lie in different planes, the double-armed lever 8 is mounted on a pivot 9 passing through a slot in the weight 7, and concentric with the motor shaft. The said lever 8 is provided with two slots 10 and 11 at opposite ends, into which the respective pin 12 or 13 on the oscillating weights engage. The purpose of the lever 8 is to render the centrifugal throw of the two weights uniform. The hubs 14 and 14¹ of the weights 6 and 7 are flattened on opposite sides and abut against the friction clutches or segments 15 in such a manner, that the throw of the oscillating weights causes the said friction clutches 15 to be pushed apart by the rotation of the hubs 14 and 14¹ and pressed against the flange of the pulley 3. The two said friction clutches 15 have bearings 18 in the disk 2 (Fig. 3) and are held by means of the pins 16 and springs 17, that is to say, forced against the flattened sides of the hubs 14 and 14¹. Instead of being loosely mounted on the hub of the disk 2 the pulley 3 can be keyed to a shaft forming a prolongation of the motor shaft.

The action of the clutch is as follows: When the motor starts the disk 2 is revolved but not the pulley 3. As soon, however, as the weights 6 and 7 have acquired sufficient momentum they oscillate about their pivots 4 and 5 and their hubs 14 and 14¹ operate the friction clutches 15 in such a manner, that the latter become operative, this taking place when the motor has reached a certain number of revolutions. As already indicated, the object of the lever 8 is to insure perfectly uniform pressure on the two friction segments. It is obvious that the clutch is automatically disengaged when the number of revolutions falls to such an extent that the throw of the weights and the rotation of the hubs 14 and 14¹ become insufficient to maintain operative contact between the friction segments and the pulley 3. With this clutch the work done in starting the machine is divided into two successive acts, namely that of starting the motor without the load and that of taking up the load. The clutch thus allows, for instance, of directly connecting mains used for electric lighting with monophase alternating motors for operating elevators or the like, since the clutch allows of starting such motors without an excessive current, the driving mechanism being automatically thrown into gear a few seconds after the motor has been started.

I claim:

The combination of a friction clutch comprising an exterior driven member and segmental interior members, springs normally separating said interior members from the exterior member, a rotatory driving member carrying said segmental members, weighted levers pivoted eccentrically on said driving member, their pivots being symmetrically placed, means connecting said weighted levers to form a mutually balancing system when the driving member is at rest whereby the line connecting the center of gravity of each weighted lever and its pivotal center is radial to the axis of the driving member, and projecting shoulders on each side of each weighted lever adapted respectively to bear against and move into operative position the corresponding segmental clutch members when the driving member rotates at and above a predetermined speed in the one or other direction.

In witness whereof I have signed this specification in the presence of two witnesses.

CASPAR WÜST-KUNZ.

Witnesses:
 JOSEPH SIMON,
 N. A. CLEMENT.